(12) United States Patent
Li et al.

(10) Patent No.: US 12,196,837 B2
(45) Date of Patent: Jan. 14, 2025

(54) METHOD OF PERCEIVING POSITION AND POSE OF HYDRAULIC SUPPORT GROUP BASED ON MULTI-POINT RANGING

(71) Applicants: SHANDONG UNIVERSITY OF SCIENCE AND TECHNOLOGY, Qingdao (CN); SHANDONG YUFEI TRANSMISSION TECHNOLOGY CO., LTD, Zoucheng (CN)

(72) Inventors: Wenhong Li, Qingdao (CN); Yi Zhang, Qingdao (CN); Fansheng Meng, Qingdao (CN); Tianyu Zhu, Qingdao (CN); Hongmei Tang, Qingdao (CN); Luqun Zhu, Qingdao (CN); Jianyu Guo, Qingdao (CN); Wenlong Zhang, Qingdao (CN); Xixin Liu, Qingdao (CN)

(73) Assignees: SHANDONG UNIVERSITY OF SCIENCE AND TECHNOLOGY, Qingdao (CN); SHANDONG YUFEI TRANSMISSION TECHNOLOGY CO., LTD, Zoucheng (CN)

( * ) Notice: Subject to any disclaimer, the term of this patent is extended or adjusted under 35 U.S.C. 154(b) by 0 days.

(21) Appl. No.: 18/515,444

(22) Filed: Nov. 21, 2023

(65) Prior Publication Data

US 2024/0369695 A1 Nov. 7, 2024

(30) Foreign Application Priority Data

Apr. 26, 2023 (CN) .......................... 202310456704.9

(51) Int. Cl.
*G01S 11/02* (2010.01)
*F15B 15/28* (2006.01)
(Continued)

(52) U.S. Cl.
CPC .......... *G01S 11/02* (2013.01); *F15B 15/2815* (2013.01); *G01B 21/04* (2013.01);
(Continued)

(58) Field of Classification Search
CPC ........ G01S 11/02; G01S 5/02; F15B 15/2815; G01B 21/04; G01B 11/27; G01B 15/00; G01F 17/00
See application file for complete search history.

(56) References Cited

U.S. PATENT DOCUMENTS

2017/0335688 A1* 11/2017 Siegrist ................. E21F 17/185
2020/0049006 A1* 2/2020 Clamp ..................... E21D 23/26
(Continued)

OTHER PUBLICATIONS

Cai et al., Relative Pose Reconstruction of Hydraulic Supports, IEEE Mar. 2023 (Year: 2023).*
(Continued)

*Primary Examiner* — Kyle R Quigley
(74) *Attorney, Agent, or Firm* — HAUPTMAN HAM, LLP

(57) ABSTRACT

The present disclosure provides a method of perceiving a position and pose of a hydraulic support group based on multi-point ranging and belongs to the field of test or measurement technologies unlisted in other categories. The method uses a hydraulic support group. The hydraulic support group includes multiple juxtaposed hydraulic supports. The method includes: with a plane above a base as a reference plane, establishing a reference coordinate system; perceiving a relative position of the base and a canopy of the hydraulic supports and perceiving a position and pose of a single hydraulic support; when the hydraulic supports have axial offset and roll phenomenon, performing offset amount calculation; based on the perception of the position and pose of single hydraulic supports, performing perception on the position and pose of the hydraulic support group. In the
(Continued)

present disclosure, the measurement devices achieve conversion of pure distance information into three-dimensional pose information of an object in time and space by using logical combination of several real-time ranging terminals, leading to simple structure; there is no interference between measurement devices, and there is wireless connection between a signal transmitting device and a signal receiving device, resulting in no rendezvous point and being free from impact of frictional force.

5 Claims, 8 Drawing Sheets

(51) Int. Cl.
    *G01B 21/04*      (2006.01)
    *G01F 17/00*      (2006.01)
    *G01S 5/02*      (2010.01)
    *G01B 11/27*      (2006.01)
    *G01B 15/00*      (2006.01)

(52) U.S. Cl.
    CPC ................ *G01F 17/00* (2013.01); *G01S 5/02* (2013.01); *G01B 11/27* (2013.01); *G01B 15/00* (2013.01)

(56) References Cited

U.S. PATENT DOCUMENTS

2021/0010373 A1*   1/2021   Wang ...................... E21D 15/51
2021/0049933 A1*   2/2021   Chen ...................... G09B 23/40
2021/0355828 A1* 11/2021   Xin ....................... E21D 11/183
2021/0388724 A1* 12/2021   Meng ...................... E21D 15/44

OTHER PUBLICATIONS

Zhang et al., Detecting Relative Position and Posture of the Hydraulic Support, IEEE, 2019 (Year: 2019).*

Zheng et al., Compliant Motion Control Technique, IEEE, 2019 (Year: 2019).*

Search Report issued in Chinese Patent Application No. 202310456704.9; dated May 30, 2023; 6 pgs.

First Office Action issued in Chinese Patent Application No. 202310456704.9; mailed Jun. 1, 2023; 13 pgs.

Notice of Grant issued in Chinese Patent Application No. 202310456704.9; mailed Jun. 20, 2023; 3 pgs.

Zhang, Yi et al; "Research on Intelligent Control System of Hydraulic Support Based on Position and Posture Detection"; Machines, vol. 11, No. 33., published Dec. 27, 2022, pp. 1-32.

* cited by examiner

METHOD OF PERCEIVING POSITION AND POSE OF HYDRAULIC SUPPORT GROUP BASED ON MULTI-POINT RANGING

RELATED APPLICATIONS

The present application claims priority from Chinese Application Number 202310456704.9 filed Apr. 26, 2023, the disclosure of which is hereby incorporated by reference herein in its entirety.

TECHNICAL FIELD

The present disclosure provides a method of perceiving a position and pose of a hydraulic support group based on multi-point ranging and belongs to the field of test or measurement technologies unlisted in other categories.

BACKGROUND

The description of absolute position and pose of a hydraulic supports in a reference space is the basis of realizing intelligentization and un-attendedness of fully-mechanized work faces. The existing detection methods of the pose of the hydraulic supports include: inertial sensor measurement, combination of ranging device and angle sensor, video monitoring, radar, ultrasonic and laser and other measurement methods. The inertial sensor measurement has the disadvantage of cumulative error and cannot be used separately and easily susceptible to vibration and therefore should be used in combination navigation, leading to increased costs. In contrast, the measurement methods such as combination of ranging device and angle sensor, video monitoring, radar, ultrasonic and laser measurement methods are greatly affected by environments. In order to perceive the absolute position and pose of the hydraulic supports in the reference space, it is necessary to provide a position-pose detection device and method of a hydraulic support group.

SUMMARY

The object of the present disclosure is to provide a method of perceiving a position and pose of a hydraulic support group based on multi-point ranging so as to solve the problem of high costs and poor effect of measurement of the position and pose of the hydraulic supports in the prior arts.

The method of perceiving the position and pose of the hydraulic support group based on multi-point ranging uses a hydraulic support group. The hydraulic support group includes: multiple juxtaposed hydraulic supports; the hydraulic supports include a base, a front link bar, a rear link bar, a caving shield, a column and a canopy; the caving shield and the canopy are hinged together with a connection point formed upward into a pointed corner; the column is hinged between a bottom of the canopy and a top of the base; the front link bar and the rear link bar are both hinged between the caving shield and the base; the front link bar is located between the rear link bar and the column; the canopy, the rear link bar and the base are all provided with respective ranging terminals; the column specifically is a column oil cylinder, and the canopy and a support beam bracket are both provided with a balance oil cylinder.

The method includes:

S1: with a plane above the base as a reference plane, establishing a reference coordinate system $\{O\}$, selecting three position points which are not in one straight line on the reference plane and then establishing a coordinate system with the three position points;

S2: perceiving a relative position of the base and the canopy of the hydraulic supports;

S3: perceiving the position and pose of a single hydraulic support;

S4: when the hydraulic supports have axial offset and roll phenomenon, performing offset amount calculation;

S5: based on the perception of the position and pose of single hydraulic support, performing perception on the position and pose of the hydraulic support group.

The step S1 includes the followings: with the ranging terminal on the canopy as origin, establishing a coordinate system $\{O_3\}$ with the origin as $O_3$; with the ranging terminal of the rear link bar as origin, establishing a coordinate system $\{O_2\}$ with the origin as $O_2$; with the ranging terminal on the base as origin, establishing a coordinate system $\{O_1\}$ with the origin as $O_1$, wherein three points are set near the $\{O_1\}$, $\{O_2\}$ and $\{O_3\}$ respectively, which are $A_1$, $B_1$, $C_1$, $A_2$, $B_2$, $C_2$, $A_3$, $B_3$, $C_3$ in sequence.

The step S2 includes the steps:

S2.1: with the ranging terminal of the base as label and the ranging terminal of the canopy as base station, the label receives distance information with the base station, namely, the labels at the points $A_1$, $B_1$, $C_1$ receive the distance information among the points $A_3$, $B_3$, $C_3$; based on the distance information and geometric relationship, the distance information is converted into an inter-plane relative position relationship;

S2.2: coordinates of the points $A_1$, $B_1$, $C_1$ in $\{O_1\}$ are: $(0, -l_{O_1A_1}, 0)$, $(l_{O_1B_1}, 0, 0)$, $(0, l_{O_1C_1}, 0)$, wherein $l_{O_1A_1}=l_{O_3A_3}$, $l_{O_1B_1}=l_{O_3B_3}$, $l_{O_1C_1}=l_{O_3C_3}$ are all self-defined during position point selection; $l_{A_1A_3}$, $l_{A_1B_3}$, $l_{A_1C_3}$, $l_{B_1A_3}$, $l_{B_1B_3}$, $l_{B_1C_3}$, $l_{C_1A_1}$, $l_{C_1B_3}$, $l_{C_1C_3}$ are all obtained by using the ranging devices, where $l_{ij}$ is a distance from a point i to a point j;

S2.3: the coordinate of the point $A_3$ in $\{O_1\}$ is set to: $(A_{3x}, A_{3y}, A_{3z})$;

the point-to-point distance formula in space is:

$$\sqrt{(A_{3x}-0)^2 + (A_{3y}-(-l_{O_1A_1}))^2 + (A_{3z}-0)^2} = l_{A_1A_3}$$

$$\sqrt{(A_{3x}-l_{O_1B_1})^2 + (A_{3y}-0)^2 + (A_{3z}-0)^2} = l_{B_1A_3}$$

$$\sqrt{(A_{3x}-0)^2 + (A_{3y}-l_{O_1C_1})^2 + (A_{3z}-0)^2} = l_{C_1A_3}$$

the point $A_3$ is always within a positive value range of $\{O_1\}$, $A_{3z}$ is valued positively to obtain a unique solution, and the coordinate of the point $B_3$ in $\{O_1\}$ is obtain: $(B_{3x}, B_{3y}, B_{3z})$; the coordinate of the point $C_3$ in the base coordinate system $\{O_1\}$ is: $(C_{3x}, C_{3y}, C_{3z})$; based on the coordinate values of the points $A_3$, $B_3$, $C_3$ obtained at a same moment, the coordinate of the point $O_3$ in the base coordinate system $\{O_1\}$ is obtained: $(O_{3x}, O_{3y}, O_{3z})$;

S2.4: rotating $\{O_1\}$ to be in the same direction as $\{O_3\}$ by three rotations:

rotating $x_1y_1z_1$ around the axis $Z_1$ to obtain x'y'z'; rotating x'y'z' around the axis y' to obtain x"y"z"; rotating x"y"z" around the axis x" to obtain $x_3y_3z_3$;

wherein $x_1y_1z_1$ are three coordinate axes under $\{O_1\}$, and x'y'z' are new coordinate axes obtained by rotating xyz around the axis $Z_1$; x"y"z" are new coordinate axis obtained by rotating x'y'z' around the axis y'; $x_3y_3z_3$ are new coordinate axes obtained by rotating x"y"z" around the axis y";

S2.5: the point $A_3$ is expressed as $\overrightarrow{O_3A_3}$ and $\overrightarrow{O_3A_3}'$ in $\{O_3\}$ and $\{O_1\}$ respectively; in combination with Rodrigues' Rotation Formula, relative pose angles between a base plane and a canopy plane are calculated as φ, θ, ø:

$$(\overrightarrow{O_3A_3})^T = C_{O_1}^{O_3}(\overrightarrow{O_3A_3}'^T)$$

wherein $C_{O_1}^{O_3}$ is a rotation matrix:

$$C_{O_1}^{O_3} = \begin{bmatrix} \cos\theta\cos\varphi & \cos\theta\sin\varphi & -\sin\theta \\ -\cos\phi\sin\varphi + \sin\phi\sin\theta\cos\varphi & \cos\phi\cos\varphi + \sin\phi\sin\theta\sin\varphi & \sin\phi\cos\theta \\ \sin\phi\sin\varphi + \cos\phi\sin\theta\cos\varphi & -\sin\phi\cos\varphi + \cos\phi\sin\theta\sin\varphi & \cos\phi\cos\theta \end{bmatrix}$$

The step of S3 includes:

neglecting the angles of φ and θ, and simplifying a single hydraulic support into a planar link-bar mechanism, and based on the inter-plane relative position relationship and structure information of the hydraulic supports, determining the pose of the single hydraulic support;

establishing a coordinate system $\{O_0\}$ with the origin located at a hinging point of the base and the rear link bar, wherein the $y_0$ axis always is parallel to the base and points to an outer side of the hydraulic supports; the $z_0$ axis is perpendicular to the $y_0$ axis and points upward; the axes $x_0$, $y_0$ and $z_0$ form a right-hand coordinate system, and three points are set near $\{O_0\}$, which are the points A, B and C in sequence respectively;

the coordinates of the following points in the coordinate system $\{O_0\}$ are:

$$A(0, 0, 0); B(0, l_{AB}, 0); C(0, l_{AC}, 0) = (0, l_{AB} + l_{BC}, 0);$$
$$D(0, 0, l_{AD}); E(0, l_{AB}, l_{BE});$$
$$F(0, l_{AC}, l_{CF}) = (0, l_{AB} + l_{BC}, l_{CF})$$

The coordinate of the point G is set to:

$$(0, G_y, G_z), G_y = -l_{GD}\cos(180° - \emptyset_1); G_z = l_{AD} + l_{GD}\sin(180° - \emptyset_i)$$

wherein $\emptyset_1$ is a relative Euler angle of two planes, which is obtained by the ranging terminal of the rear link bar and the ranging terminal of the base based on geometric relationship;

the coordinate of the point H is set to:

$$(0, H_y, H_z), H_y = E_y - l_{EH}\cos(\alpha_4 + \alpha_5); H_z = E_z + l_{EH}\sin(\alpha_4 + \alpha_5);$$
$$\alpha_1 = \arctan\left(\frac{l_{BE} - l_{AD}}{l_{AB}}\right); \alpha_2 = \emptyset_1 - \alpha_1;$$

$$l_{GE} = \sqrt{l_{DG}^2 + l_{DE}^2 - 2l_{DG}l_{DE}\cos\alpha_2}; \alpha_3 = \alpha_1;$$
$$\alpha_4 = \arccos\left(\frac{l_{GE}^2 - l_{DE}^2 - l_{DG}^2}{2l_{GE}l_{DE}}\right) - \alpha_3; \alpha_5 = \arccos\left(\frac{l_{GE}^2 - l_{EH}^2 - l_{GH}^2}{2l_{GE}l_{EH}}\right)$$

the coordinate of the point L is set to:

$$(0, L_y, L_z), L_y = G_y - l_{GL}\cos(180° - \alpha_7 - \alpha_8);$$
$$L_z = G_z + l_{GL}\sin(180° - \alpha_7 - \alpha_8);$$
$$\alpha_6 = \alpha_4; \alpha_7 = \arccos\left(\frac{l_{GH}^2 - l_{GE}^2 - l_{EH}^2}{2l_{GH}l_{GE}}\right) - \alpha_6; \alpha_8 = \arctan\left(\frac{l_{ML}}{l_{GL} - l_{MH}}\right)$$

the coordinate of the point M is set to:

$$(0, M_y, M_z), M_y = L_y + l_{ML}\cos\alpha_9; M_z = L_z + l_{ML}\sin\alpha_9;$$
$$\alpha_9 = 90° - (180° - \alpha_7 - \alpha_8) = \alpha_7 + \alpha_8 - 90°$$

the coordinate of the point N is set to:

$$(0, N_y, N_z), N_y = L_y + l_{NL}\cos\alpha_9; N_z = L_z + l_{NL}\sin\alpha_9$$

the coordinate of the point P is set to:

$$(0, P_y, P_z), P_y = L_y + l_{PL}\cos\alpha_9; P_z = L_z + l_{PL}\sin\alpha_9$$

the coordinate of the point I is set to:

$$(0, I_y, I_z), I_y = N_y + l_{NI}\sin\alpha_{10}; I_z = N_z - l_{NI}\cos\alpha_{10}; \alpha_{10} = \alpha_9$$

the coordinate of the point Q is set to:

$$(0, Q_y, Q_z), Q_y = P_y + l_{PQ}\sin\alpha_{11}; Q_z = P_z - l_{PQ}\cos\alpha_{11}; \alpha_{11} = \alpha_{10} = \alpha_9$$

the coordinate of the point R is set to:

$$(0, R_y, R_z), R_y = Q_y - l_{RQ}\sin(\alpha_{11} - \alpha_{12});$$
$$R_z = Q_z + l_{RQ}\cos(\alpha_{11} - \alpha_{12})\alpha_{12} = \alpha_7 + \alpha_8 - \emptyset_2 - 90°$$

wherein $\emptyset_2$ is a relative Euler angle of two planes, which is obtained by the ranging terminal of the canopy and the ranging terminal of the base based on geometric relationship;

the coordinate of the point S is set to:

$$(0, S_y, S_z), S_y = R_y + l_{RS}\cos\emptyset_2; S_z = R_z + l_{RS}\sin\emptyset_2$$

the coordinate of the point T is set to:

$$(0, T_y, T_z), T_y = R_y + l_{RT}\cos\phi_2; T_z = R_z + l_{RT}\sin\phi_2$$

the coordinate of the point J is set to:

$$(0, J_y, J_z), J_y = S_y + l_{SJ}\sin\phi_2; J_z = S_z - l_{SJ}\cos\phi_2$$

the coordinate of the point K is set to:

$$(0, K_y, K_z), K_y = T_y + l_{TK}\sin\phi_2; K_z = T_z - l_{TK}\cos\phi_2$$

wherein T, S and R are sequentially disposed on the canopy, Q is disposed at the hinging connection of the canopy and a support beam, P, N, M and L are sequentially disposed on the support beam, G is disposed at the hinging connection of the support beam and the rear link bar, D is disposed at the hinging connection of the rear link bar and the base, H is disposed at the hinging connection of the front link bar and the support beam, E is disposed at the hinging connection of the front link bar and the base, I and J are disposed at both ends of the balance oil cylinder respectively, A, B and C are all disposed on the base and correspond to the positions D, E and F respectively, and K is disposed at the hinging connection of the column and the canopy.

The step of S4 includes the following steps: the angles of φ and θ are considered and a dual-column hydraulic support model is used; at this time, elongation amounts of two columns are different and one group of caving shield ranging base station is added into the pose perception of the hydraulic supports;

S3.1: the coordinates of the points K, K', R, R', W, W' in $\{O_3\}$ are already known, and the position $\bar{r}_i|_{O_1}$ of the points in $\{O_1\}$ is calculated, wherein the points K and K' are at both sides of the connection of the canopy and the column, the points R and R' are at both sides of the connection of the canopy and the support beam, and the points W and W' are at both sides of the front end of the canopy;

$$\bar{r}_i|_{o_1} = i|_{o_1} - o_3|_{o_1} = (C_{o_1}^{o_3})^{-1}\bar{r}_i|_{o_3} = (C_{o_1}^{o_3})^{-1}(i|_{o_3} - o_3|_{o_3})$$

wherein i refers to the points K, K', R, R', W, W', and $i|_{O_1}$ refers to the coordinates of six points in $\{O_1\}$; $C_{O_1}^{O_3}$ is a coordinate transformation matrix between $\{O_3\}$ and $\{O_1\}$; $i|_{O_3}$ is the coordinates of four points in $\{O_3\}$; $O_3|_{O_3}$ is the coordinate of the point $O_3$ in $\{O_3\}$, i.e. $O_3|_{O_3}=(0,0,0)$; $O_3|_{O_3}$ is the coordinate of the point $O_3$ of $\{O_3\}$ in $\{O_1\}$;

S3.2: true lengths of two columns of the hydraulic supports are calculated:

the length $l_{KF}$ of the column oil cylinder KF is:

$$l_{KF} = \sqrt{(K_x - F_x)^2 + (K_y - F_y)^2 + (K_z - F_z)^2}$$

the length $l_{K'F'}$ of the column oil cylinder K'F' is:

$$l_{K'F'} = \sqrt{(K'_x - F'_x)^2 + (K'_y - F'_y)^2 + (K'_z - F'_z)^2}$$

wherein $K_x$, $K_y$, $K_z$ are the coordinate of the point K, $K'_x$, $K'_y$, $K'_z$ are the coordinate of the point K', $F_x$, $F_y$, $F_z$ are the coordinate of the point F, and $F'_x$, $F'_y$, $F'_z$ are the coordinate of the point F';

S3.2: the axial offset amount of the canopy of the hydraulic supports is calculated:

a projection point $R_R(R_{Rx}, R_{Ry}, 0)$ of the point R in $\{O_1\}$ when no axial offset and roll occurs to the canopy of the hydraulic supports is recorded, and at this time, $R_{Rx}$ is determined by the position of the ranging terminal of the base and the size of the hydraulic supports; when the projection points of the points R and W in $\{O_1\}$ are $R_R$ and $W_W$: $R_R(R_x, R_y, 0)$, and $W_W(W_x, W_y, 0)$, the axial offset amount of the canopy is l:

$$l = |R_x - R_{Rx} + W_x - R_x| = |W_x - R_{Rx}|$$

The step S5 includes the followings: with three ranging terminals as labels and the ranging terminal of the base as base station, the labels receive distance information with the base stations of the bases of three hydraulic supports respectively and determine the position of the hydraulic support group in the reference coordinate system:

the relationship of $\{O_0\}$ and $\{O_1\}$ is a translation relationship, and the point of $\{O_0\}$ is expressed in $\{O_1\}$:

$$(i, j, k)|_{o_1} = (i|_{o_0} + l_{o_0 o_1}|_x, j|_{o_0} - l_{o_0 o_1}|_y, k|_{o_0})$$

wherein $(i,j,k)|_{O_1}$ is the coordinate of a particular point in $\{O_1\}$; $i|_{O_0}$ is an x axis coordinate of a particular point in $\{O_0\}$; $j|_{O_0}$ is a y axis coordinate of a particular point in $\{O_0\}$; $k|_{O_0}$ is a z axis coordinate of a particular point in $\{O_0\}$; $l_{O_0 O_1}|_x$ is a component of the distance from the point $O_0$ to the point $O_1$ on the x axis; and $l_{O_0 O_1}|_y$ is a component of the distance from the point $O_0$ to the point $O_1$ on the y axis;

each point is represented as a vector relationship to obtain a vector $\bar{r}'_i|_{O_1}$; $\bar{r}'_i|_O = i|_O - O_1|_O = (C_O^{O_1})^{-1}$ $\bar{r}'_i|_{O_1} = (C_O^{O_1})^{-1}(i|_{O_1} - O_1|_{O_1})$ wherein i represents each point; $i|_O$ is the coordinate of each hinging point in the reference coordinate system $\{O\}$; $C_O^{O_1}$ is a pose transformation matrix between $\{O\}$ and $\{O_1\}$; $i|_{O_1}$ is the coordinate of each hinging point in $\{O_1\}$; $O_1|_{O_1}$ is the coordinate of the point $O_1$ in $\{O_1\}$, i.e. $O_1|_{O_1}=(0,0,0)$; $O_1|_O$ is the coordinate of the origin $O_1$ of $\{O_1\}$ in the reference coordinate system $\{O\}$.

Compared with the prior arts, the present disclosure has the following beneficial effects: the measurement devices achieve conversion of pure distance information into three-dimensional pose information of an object in time and space by using logical combination of several real-time ranging terminals, leading to simple structure; there is no interference between measurement devices, and there is wireless connection between a signal transmitting device and a signal receiving device, resulting in no rendezvous point and being free from impact of frictional force; the pose information of single hydraulic support is measured and the pose of the hydraulic supports when large axial offset and roll occur to the hydraulic supports is accurately measured, and further, the true lengths of the two columns of the hydraulic supports and the axial offset amount of the canopy of the hydraulic supports are calculated; the position and pose information of each hydraulic support in the reference space is clearly determined.

BRIEF DESCRIPTIONS OF THE DRAWINGS

Numerals of the drawings are described below: 1. reference plane, 2. ranging terminal of reference plane, 3. base coordinate system, 4. front link bar, 5. ranging terminal of rear link bar, 6. rear link bar, 7. first hydraulic support, 8. second hydraulic support, 9. third hydraulic support, 10. caving shield, 11. canopy, 12. column, 13. ranging terminal of canopy, 14. advance bar, 15. balance oil cylinder, 16. advance oil cylinder, 17. ranging terminal of base coordinate system.

DETAILED DESCRIPTIONS OF EMBODIMENTS

In order to make the objects, technical solutions and advantages of the present disclosure clearer, the technical solutions of the present disclosure will be fully and clearly described below. Apparently, the embodiments described herein are merely some embodiments of the present disclosure rather than all embodiments. All other embodiments obtained by those skilled in the arts based on these embodiments of the present disclosure without making creative work shall fall within the scope of protection of the present disclosure.

Figure 1:
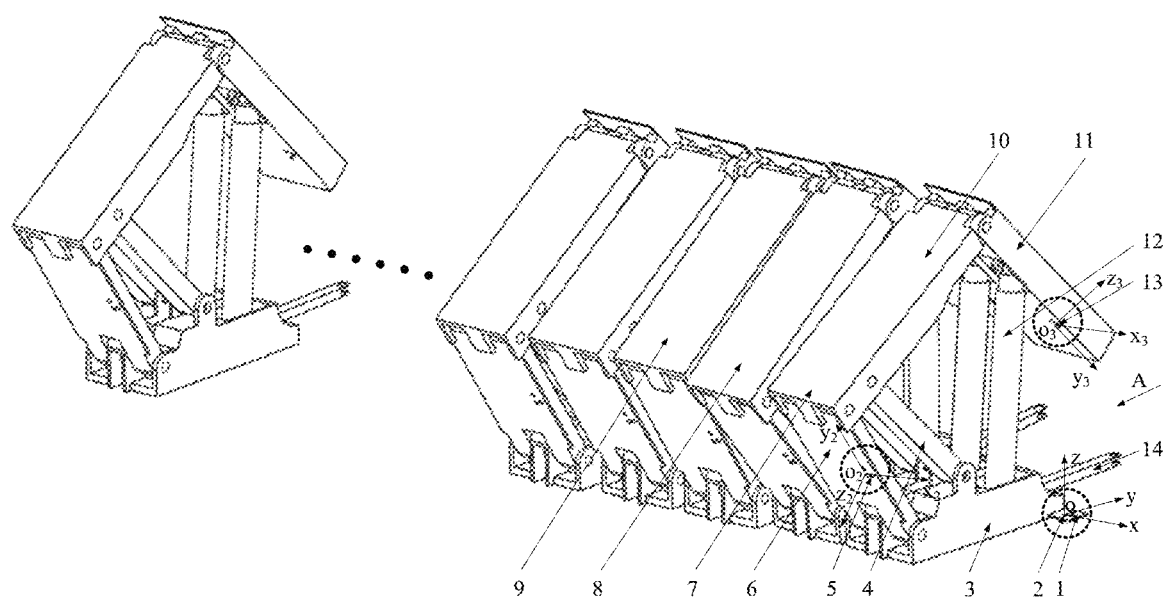
FIG. 1 is a schematic diagram illustrating a hydraulic support according the present disclosure.
Figure 2:
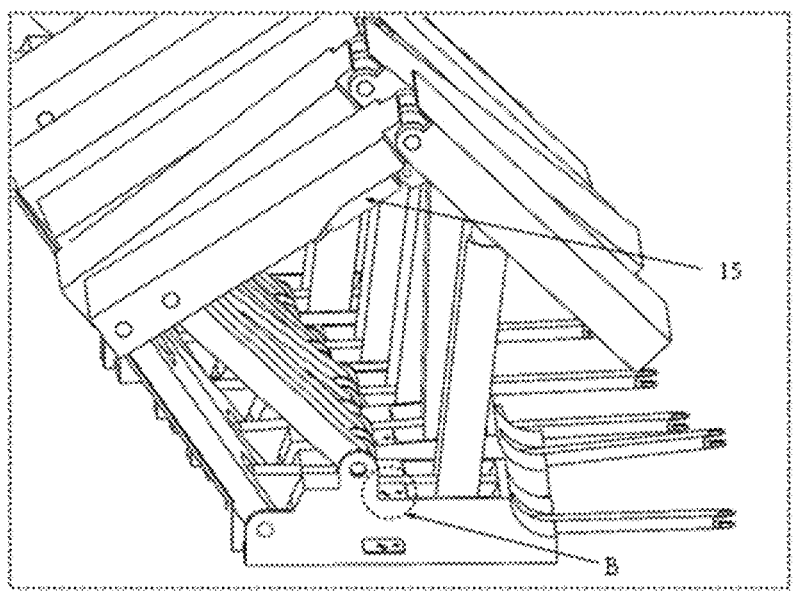
FIG. 2 is a view of direction A in FIG. 1.
Figure 3:
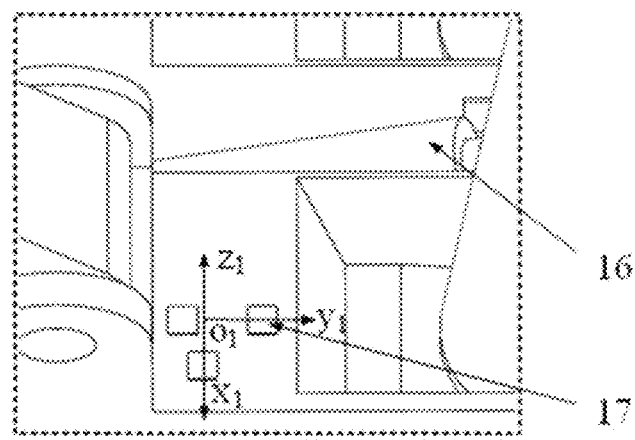
FIG. 3 is an enlarged view of the part B in FIG. 2.
Figure 7:
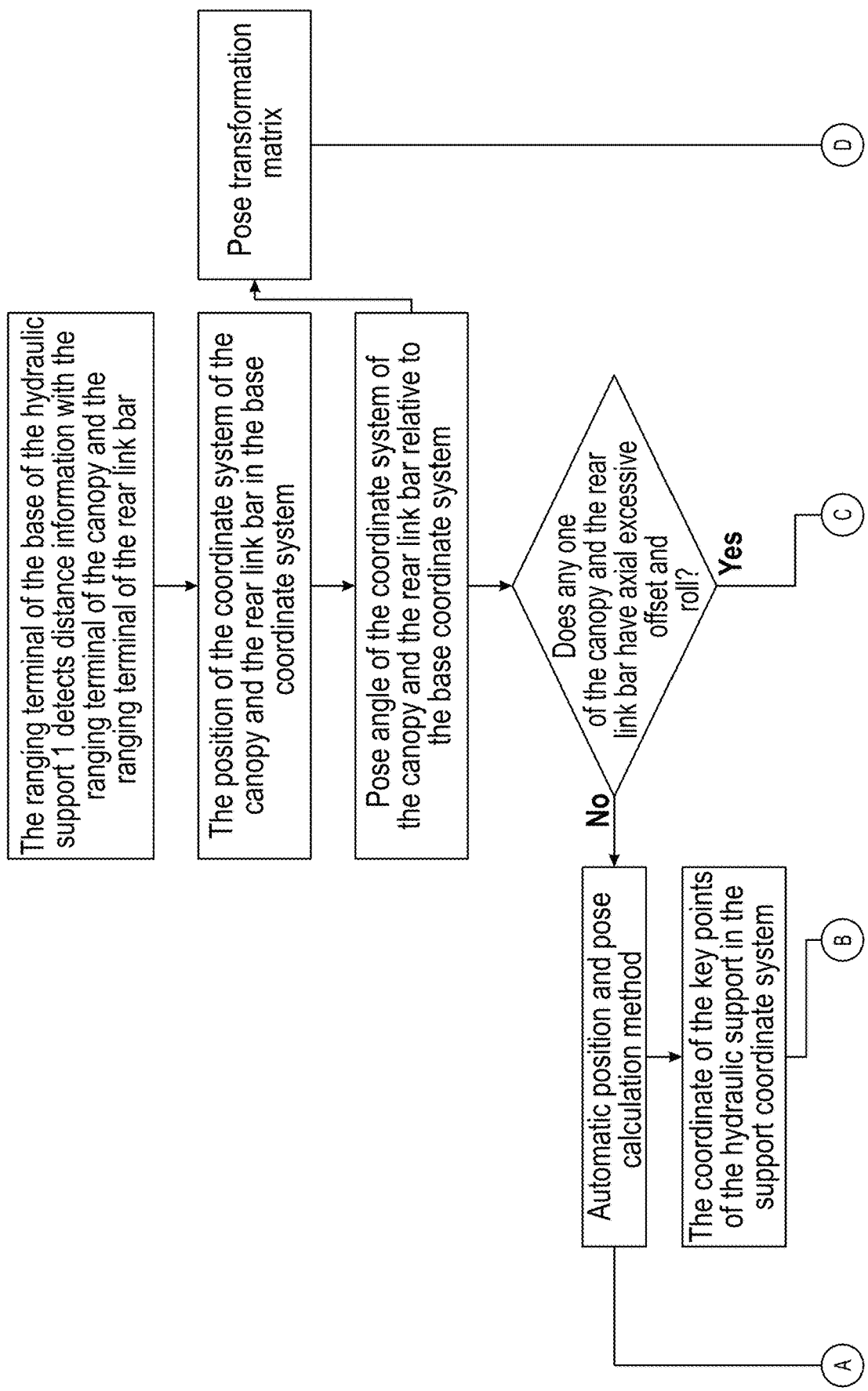
FIG. 7 is a flowchart of solving the position and pose of the single hydraulic support.
Figure 7:
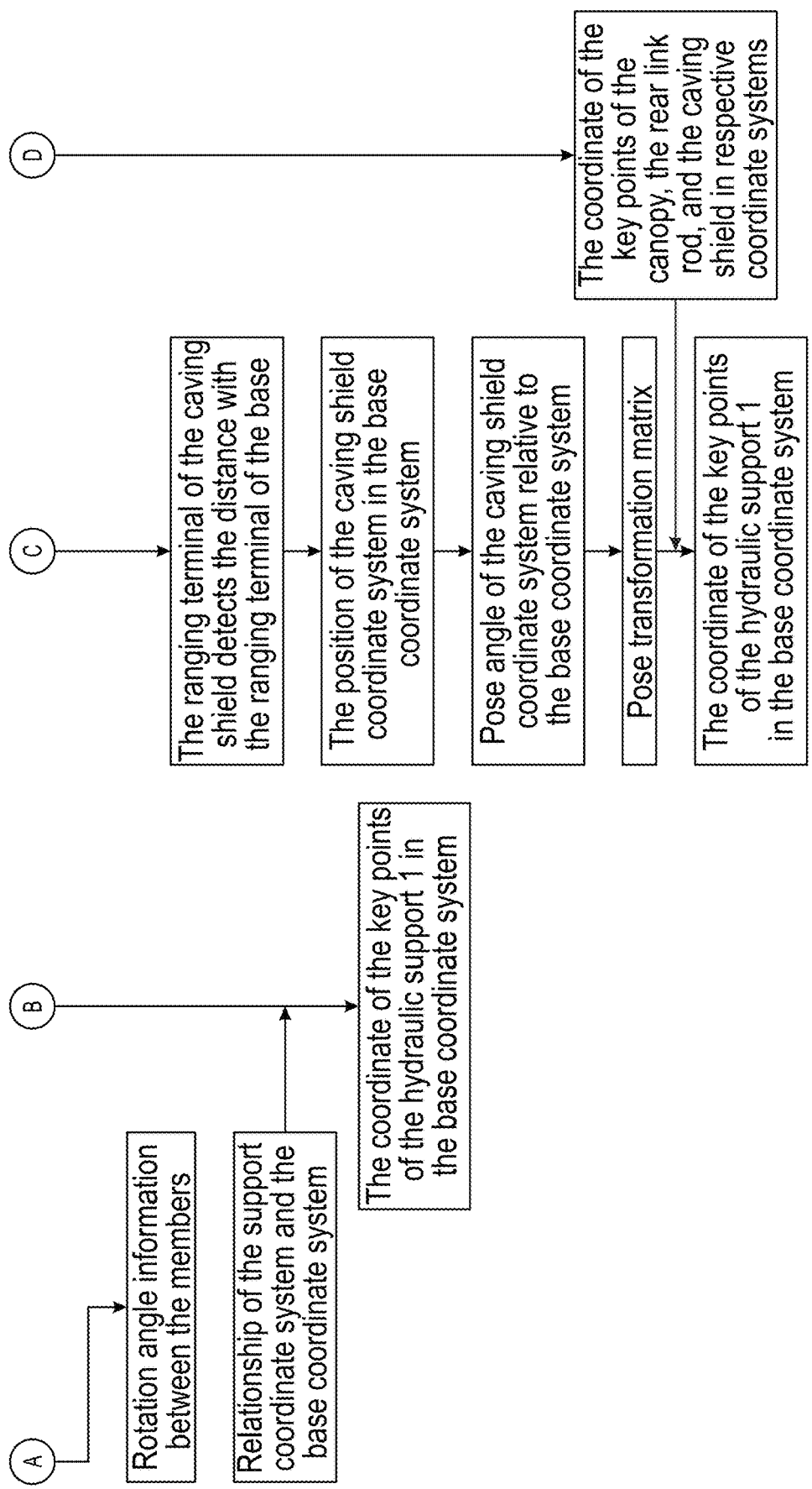
Figure 8:
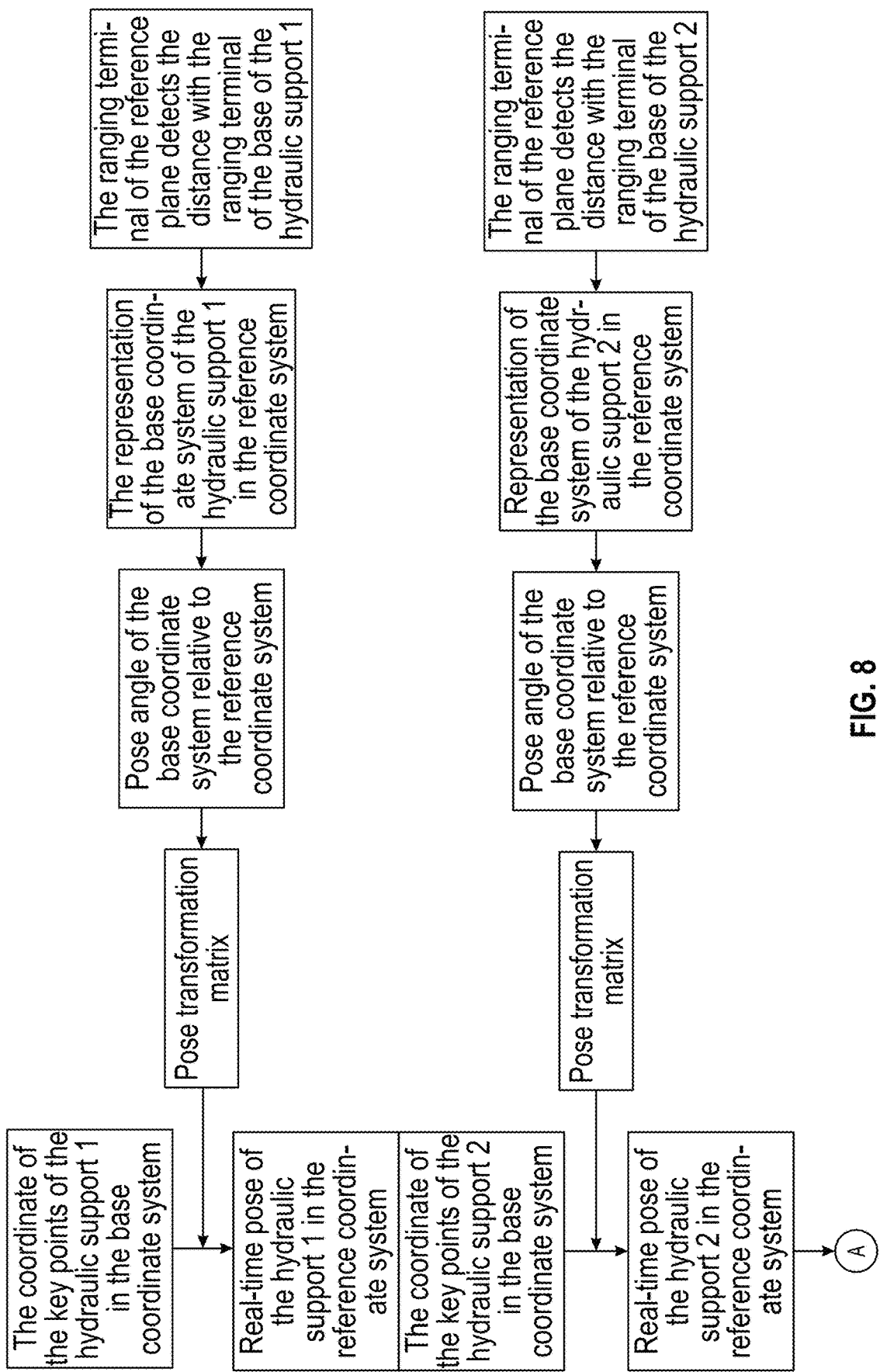
FIG. 8 is a flowchart of the method of FIG. 7 extended to measurement of multiple supports.
Figure 8:
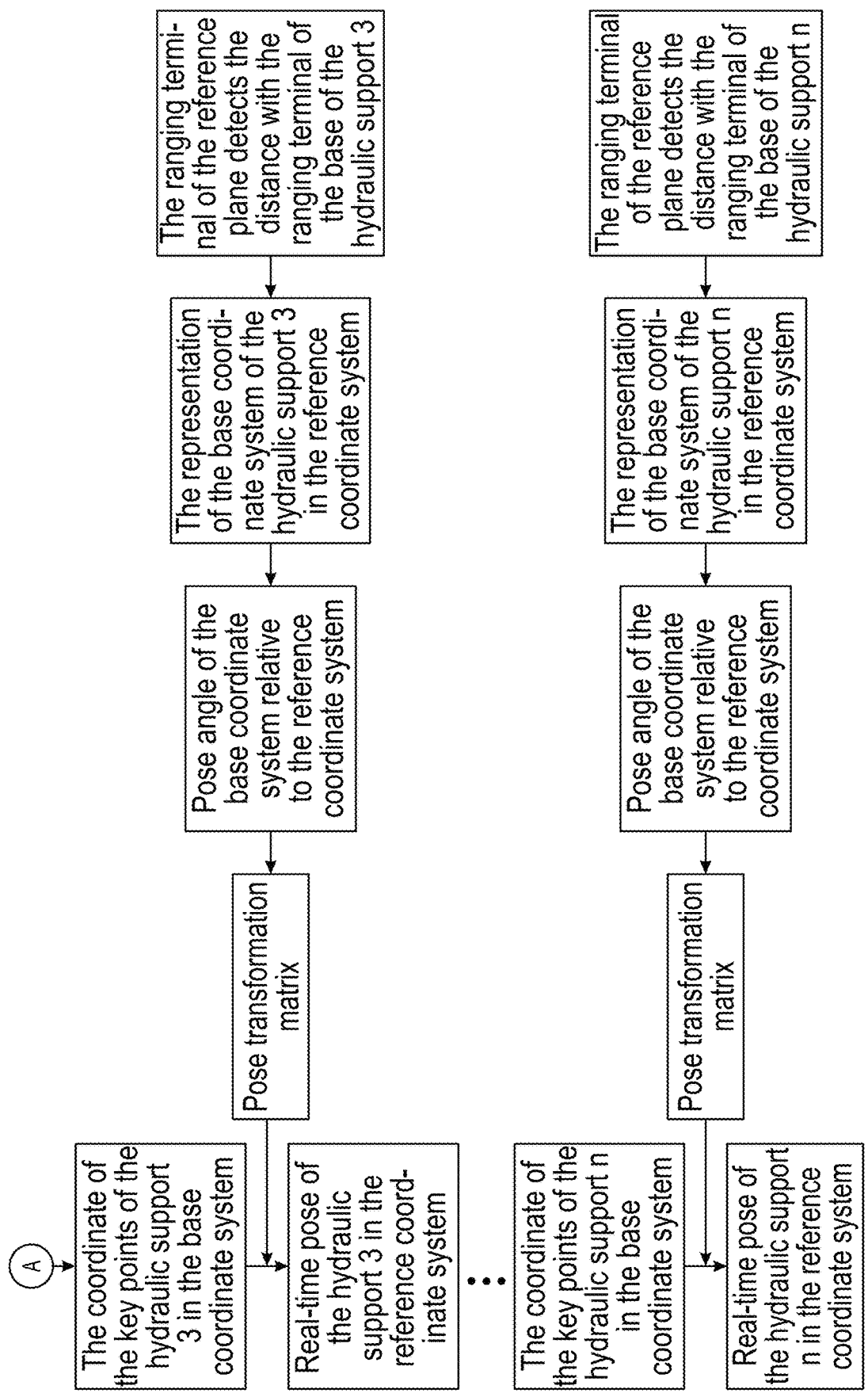

There is provided a method of perceiving a position and pose of a hydraulic support group based on multi-point ranging, which uses a hydraulic support group. As shown in FIGS. 1, 2 and 3, the hydraulic support group includes multiple juxtaposed hydraulic supports; the hydraulic supports include a base, a front link bar 4, a rear link bar 6, a caving shield 10, a column 12 and a canopy 11; the caving shield 10 and the canopy 11 are hinged together with a connection point formed upward into a pointed corner; the column 12 is hinged between a bottom of the canopy 11 and a top of the base; the front link bar 4 and the rear link bar 6 are both hinged between the caving shield 10 and the base; the front link bar 4 is located between the rear link bar 6 and the column 12; the canopy 11, the rear link bar 6 and the base are all provided with respective ranging terminals; the column 12 specifically is a column 12 oil cylinder, and the canopy 11 and a support beam bracket are both provided with a balance oil cylinder 15;

The method includes:

S1: with a plane above the base as a reference plane 1, establishing a reference coordinate system $\{O\}$, selecting three position points which are not in one straight line on the reference plane and then establishing a coordinate system with the three position points;

S2: perceiving a relative position of the base and the canopy 11 of the hydraulic supports;

S3: as shown in FIG. 7, perceiving the position and pose of a single hydraulic support;

S4: when the hydraulic supports have axial offset and roll phenomenon, performing offset amount calculation;

S5: as shown in FIG. 8, based on the perception of the position and pose of single hydraulic support, performing perception on the position and pose of the hydraulic support group.

Figure 4:
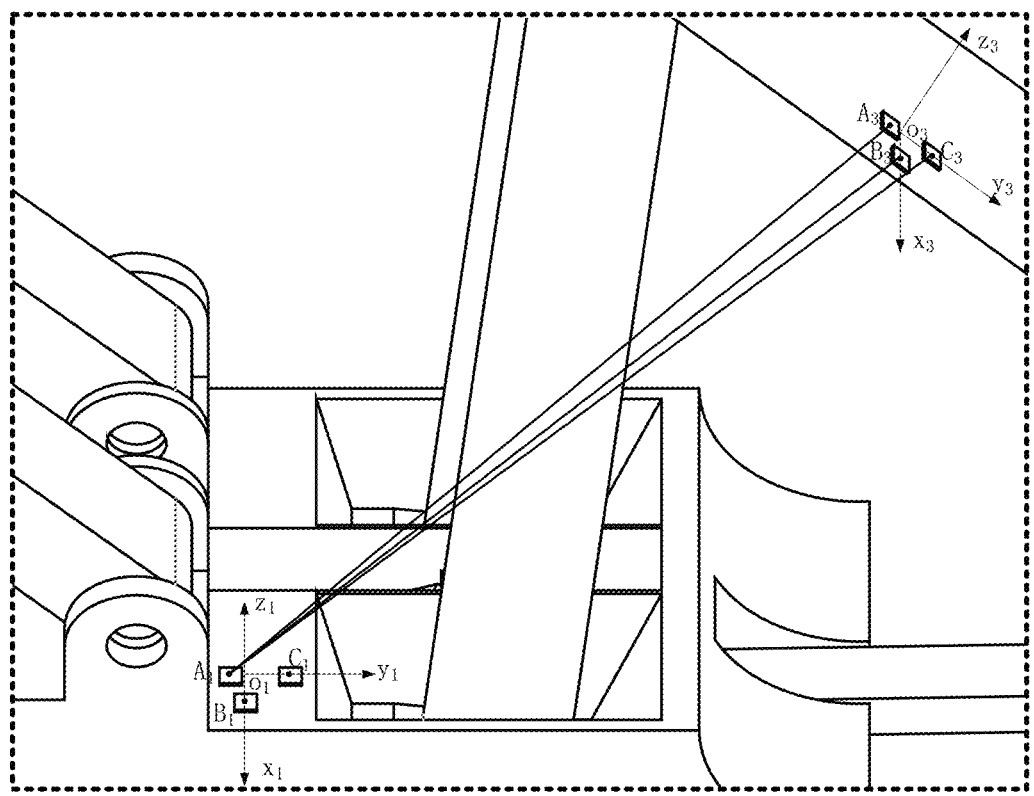
FIG. 4 is a diagram illustrating a relative position of two coordinate systems $\{O_1\}$ and $\{O_3\}$.

The step S1 includes: as shown in FIG. 4, with the ranging terminal on the canopy 11 as origin, establishing a coordinate system $\{O_3\}$ with the origin as $O_3$; with the ranging terminal of the rear link bar 6 as origin, establishing a coordinate system $\{O_2\}$ with the origin as $O_2$; with the ranging terminal on the base as origin, establishing a coordinate system $\{O_1\}$ with the origin as $O_1$, wherein three points are set near the $\{O_1\}$, $\{O_2\}$ and $\{O_3\}$ respectively, which are $A_1$, $B_1$, $C_1$, $A_2$, $B_2$, $C_2$, $A_3$, $B_3$, $C_3$ in sequence.

The step S2 includes the following steps:

S2.1: with the ranging terminal of the base as label and the ranging terminal of the canopy 11 as base station, the label receives distance information with the base station, namely, the labels at the points $A_1$, $B_1$, $C_1$ receive the distance information among the points $A_3$, $B_3$, $C_3$; based on the distance information and geometric relationship, the distance information is converted into an inter-plane relative position relationship;

S2.2: coordinates of the points $A_1$, $B_1$, $C_1$ in $\{O_1\}$ are: $(0, -l_{O_1A_1}, 0)$, $(l_{O_1B_1}, 0, 0)$, $(0, l_{O_1C_1}, 0)$, wherein $l_{O_1A_1}=l_{O_3A_3}$, $l_{O_1B_1}=l_{O_3B_3}$, $l_{O_1C_1}=l_{O_3C_3}$ are all self-defined during position point selection; $l_{A_1A_3}$, $l_{A_1B_3}$, $l_{A_1C_3}$, $l_{B_1A_3}$, $l_{B_1B_3}$, $l_{B_1C_3}$, $l_{C_1A_3}$, $l_{C_1B_3}$, $l_{C_1C_3}$ are all obtained by using the ranging devices, wherein $l_{ij}$ is a distance from a point i to a point j;

S2.3: the coordinate of the point $A_3$ in $\{O_1\}$ is set to: $(A_{3x}, A_{3y}, A_{3z})$;

the point-to-point distance formula in space is:

$$\sqrt{(A_{3x}-0)^2 + (A_{3y}-(-l_{O_1A_1}))^2 + (A_{3z}-0)^2} = l_{A_1A_3}$$

$$\sqrt{(A_{3x}-l_{O_1B_1})^2 + (A_{3y}-0)^2 + (A_{3z}-0)^2} = l_{B_1A_3}$$

$$\sqrt{(A_{3x}-0)^2 + (A_{3y}-l_{O_1C_1})^2 + (A_{3z}-0)^2} = l_{C_1A_3}$$

the point $A_3$ is always within a positive value range of $\{O_1\}$, $A_{3z}$ is valued positively to obtain a unique solution, and the coordinate of the point $B_3$ in $\{O_1\}$ is obtain $(B_{3x}, B_{3y}, B_{3z})$; the coordinate of the point $C_3$ in the base coordinate system $3\{O_1\}$ is: $(C_{3x}, C_{3y}, C_{3z})$; based on the coordinate values of the points $A_3$, $B_3$, $C_3$ obtained at a same moment, the coordinate of the point $O_3$ in the base coordinate system $3\{O_1\}$ is obtained: $(O_{3x}, O_{3y}, O_{3z})$;

S2.4: rotating $\{O_1\}$ to be in the same direction as $\{O_3\}$ by three rotations:

rotating $x_1y_1z_1$ around the axis $Z_1$ to obtain x'y'z'; rotating x'y'z' around the axis y' to obtain x"y"z"; rotating x"y"z" around the axis x" to obtain $x_3y_3z_3$;

wherein $x_1y_1z_1$ are three coordinate axes under $\{O_1\}$, and x'y'z' are new coordinate axes obtained by rotating xyz around the axis $Z_1$; x"y"z" are new coordinate axes obtained by rotating x'y'z' around the axis y'; $x_3y_3z_3$ are new coordinate axes obtained by rotating x"y"z" around the axis y";

S2.5: the point $A_3$ is expressed as $\overrightarrow{O_3A_3}$ and $\overrightarrow{O_3A_3}'$ in $\{O_3\}$ and $\{O_1\}$ respectively; in combination with Rodrigues' Rotation Formula, relative pose angles between a base plane and a canopy plane are calculated as φ, θ, ø.

$$(\overrightarrow{O_3A_3})^T = C_{O_1}^{O_3}(\overrightarrow{O_3A_3}'^T);$$

wherein $C_{O_1}^{O_3}$ is a rotation matrix:

$$C_{O_1}^{O_3} = \begin{bmatrix} \cos\theta\cos\varphi & \cos\theta\sin\varphi & -\sin\theta \\ -\cos\phi\sin\varphi + \sin\phi\sin\theta\cos\varphi & \cos\phi\cos\varphi + \sin\phi\sin\theta\sin\varphi & \sin\phi\cos\theta \\ \sin\phi\sin\varphi + \cos\phi\sin\theta\cos\varphi & -\sin\phi\cos\varphi + \cos\phi\sin\theta\sin\varphi & \cos\phi\cos\theta \end{bmatrix}$$

The step S3 includes:
neglecting the angles of φ and θ, and simplifying a single hydraulic support into a planar link-bar mechanism, and based on the inter-plane relative position relationship and structure information of the hydraulic supports, determining the pose of the single hydraulic support;
establishing a coordinate system $\{O_0\}$ with the origin located at a hinging point of the base and the rear link bar 6, wherein the $y_0$ axis always is parallel to the base and points to an outer side of the hydraulic supports; the $z_0$ axis is perpendicular to the $y_0$ axis and points upward; the axes $x_0$, $y_0$ and $z_0$ form a right-hand coordinate system, and three points are set near $\{O_0\}$, which are the points A, B and C in sequence respectively;
the coordinates of the following points in the coordinate system $\{O_0\}$ are:

$$A(0, 0, 0); B(0, l_{AB}, 0); C(0, l_{Ac}, 0) = (0, l_{AB} + l_{BC}, 0);$$
$$D(0, 0, l_{AD}); E(0, l_{AB}, l_{BE});$$
$$F(0, l_{AC}, l_{CF}) = (0, l_{AB} + l_{BC}, l_{CF})$$

the coordinate of the point G is set to:

$$(0, G_y, G_z), G_y = -l_{GD}\cos(180° - \phi_1); G_z = l_{AD} + l_{GD}\sin(180° - \phi_1)$$

wherein $\phi_1$ is a relative Euler angle of two planes, which is obtained by the ranging terminal 5 of the rear link bar and the ranging terminal of the base based on geometric relationship;
the coordinate of the point H is set to:

$$(0, H_y, H_z), H_y = E_y - l_{EH}\cos(\alpha_4 + \alpha_5); H_z = E_z + l_{EH}\sin(\alpha_4 + \alpha_5);$$
$$\alpha_1 = \arctan\left(\frac{l_{BE} - l_{AD}}{l_{AB}}\right); \alpha_2 = \phi_1 - \alpha_1;$$

$$l_{GE} = \sqrt{l_{DG}^2 + l_{DE}^2 - 2l_{DG}l_{DE}\cos\alpha_2}; \alpha_3 = \alpha_1;$$
$$\alpha_4 = \arccos\left(\frac{l_{GE}^2 + l_{DE}^2 - l_{DG}^2}{2l_{GE}l_{DE}}\right) - \alpha_3; \alpha_5 = \arccos\left(\frac{l_{GE}^2 + l_{EH}^2 - l_{GH}^2}{2l_{GE}l_{EH}}\right)$$

the coordinate of the point L is set to:

$$(0, L_y, L_z), L_y = G_y - l_{GL}\cos(180° - \alpha_7 - \alpha_8);$$
$$L_z = G_z + l_{GL}\sin(180° - \alpha_7 - \alpha_8);$$
$$\alpha_6 = \alpha_4; \alpha_7 = \arccos\left(\frac{l_{GH}^2 + l_{GE}^2 - l_{EH}^2}{2l_{GH}l_{GE}}\right) - \alpha_6; \alpha_8 = \arctan\left(\frac{l_{ML}}{l_{GL} - l_{MH}}\right)$$

the coordinate of the point M is set to:

$$(0, M_y, M_z), M_y = L_y + l_{ML}\cos\alpha_9; M_z = L_z + l_{ML}\sin\alpha_9;$$
$$\alpha_9 = 90° - (180° - \alpha_7 - \alpha_8) = \alpha_7 + \alpha_8 - 90°$$

the coordinate of the point N is set to:

$$(0, N_y, N_z), N_y = L_y + l_{NL}\cos\alpha_9; N_z = L_z + l_{NL}\sin\alpha_9$$

the coordinate of the point P is set to:

$$(0, P_y, P_z), P_y = L_y + l_{PL}\cos\alpha_9; P_z = L_z + l_{PL}\sin\alpha_9$$

the coordinate of the point I is set to:

$$(0, I_y, I_z), I_y = N_y + l_{NI}\sin\alpha_{10}; I_z = N_z - l_{NI}\cos\alpha_{10}; \alpha_{10} = \alpha_9$$

the coordinate of the point Q is set to:

$$(0, Q_y, Q_z), Q_y = P_y + l_{PQ}\sin\alpha_{11}; Q_z = P_Z - l_{PQ}\cos\alpha_{11}; \alpha_{11} = \alpha_{10} = \alpha_9$$

the coordinate of the point R is set to:

$$(0, R_y, R_z), R_y = Q_y - l_{RQ}\sin(\alpha_{11} - \alpha_{12});$$
$$R_z = Q_z + l_{RQ}\cos(\alpha_{11} - \alpha_{12})\alpha_{12} = \alpha_7 + \alpha_8 + \phi_2 - 90°$$

wherein $\phi_2$ is a relative Euler angle of two planes, which is obtained by the ranging terminal of the canopy and the ranging terminal of the base based on geometric relationship;
the coordinate of the point S is set to:

$$(0, S_y, S_z), S_y = R_y + l_{RS}\cos\phi_2; S_z = R_z + l_{RS}\sin\phi_2$$

the coordinate of the point T is set to:

$$(0, T_y, T_z), \quad T_y = R_y + l_{RT}\cos\phi_2; T_z = R_z + l_{RT}\sin\phi_2$$

the coordinate of the point J is set to:

$$(0, J_y, J_z), \quad J_y = S_y + l_{SJ}\sin\phi_2; J_z = S_z - l_{SJ}\cos\phi_2$$

the coordinate of the point K is set to:

$$(0, K_y, K_z), \quad K_y = T_y + l_{TK}\sin\phi_2; K_z = T_z - l_{TK}\cos\phi_2$$

wherein T, S and R are sequentially disposed on the canopy 11, Q is disposed at the hinging connection of the canopy 11 and a support beam, P, N, M and L are sequentially disposed on the support beam, G is disposed at the hinging connection of the support beam and the rear link bar 6, D is disposed at the hinging connection of the rear link bar 6 and the base, H is disposed at the hinging connection of the front link bar 4 and the support beam, E is disposed at the hinging connection of the front link bar 4 and the base, I and J are disposed at both ends of the balance oil cylinder 15 respectively, A, B and C are all disposed on the base and correspond to the positions D, E and F respectively, and K is disposed at the hinging connection of the column 12 and the canopy 11.

Figure 6:
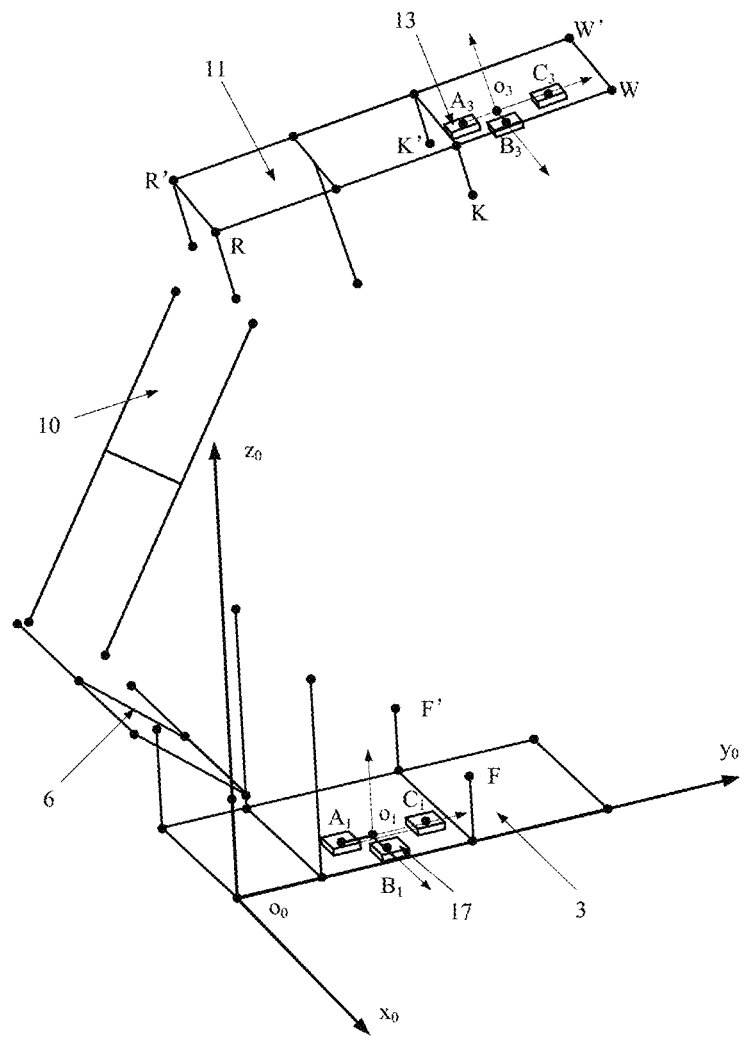
FIG. 6 is a distribution diagram of some points after one group of ranging base station of the caving shield is added.

The step S4 includes the following steps: the angles of φ and θ are considered and a dual-column hydraulic support model is used; at this time, elongation amounts of two columns are different and as shown in FIG. 6, one group of caving shield 10 ranging base station is added into the pose perception of the hydraulic supports;

S3.1: the coordinates of the points K, K', R, R', W, W' in {O₃} are already known, and the position $\vec{r}_i|_{O_1}$ of the points in {O₁} is calculated, wherein the points K and K' are at both sides of the connection of the canopy 11 and the column 12, the points R and R' are at both sides of the connection of the canopy 11 and the support beam, and the points W and W' are at both sides of the front end of the canopy 11;

$$\vec{r}_i|_{o_1} = i|_{o_1} - o_3|_{o_1} = (C_{o_1}^{o_3})^{-1}\vec{r}_i|_{o_3} = (C_{o_1}^{o_3})^{-1}(i|_{o_3} - o_3|_{o_3})$$

wherein i refers to the points K, K', R, R', W, W', and $i|_{O_1}$ refers to the coordinates of six points in {O₁}; $C_{O_1}^{O_3}$ is a coordinate transformation matrix between {O₃} and {O₁}; $i|_{O_3}$ is the coordinates of four points in {O₃}; $O_3|_{O_3}$ is the coordinate of the point O₃ in {O₃}, i.e. $O_3|_{O_3}=(0,0,0)$; $O_3|_{O_1}$ is the coordinate of the point O₃ of {O₃} in {O₁};

S3.2: true lengths of two columns 12 of the hydraulic supports are calculated:
the length $l_{KF}$ of the column oil cylinder KF is:

$$l_{KF} = \sqrt{(K_x - F_x)^2 + (K_y - F_y)^2 + (K_z - F_z)^2}$$

the length $l_{K'F'}$ of the column oil cylinder K'F' is:

$$l_{K'F'} = \sqrt{(K'_x - F'_x)^2 + (K'_y - F'_y)^2 + (K'_z - F'_z)^2}$$

wherein $K_x$, $K_y$, $K_z$ are the coordinate of the point K, $K'_x$, $K'_y$, $K'_z$ are the coordinate of the point K', $F_x$, $F_y$, $F_z$ are the coordinate of the point F, and $F'_x$, $F'_y$, $F'_z$ are the coordinate of the point F';

S3.2: the axial offset amount of the canopy 11 of the hydraulic supports is calculated:
a projection point $R_R(R_{Rx}, R_{Ry}, 0)$ of the point R in {O₁} when no axial offset and roll occurs to the canopy 11 of the hydraulic supports is recorded, and at this time, $R_{Rx}$ is determined by the position of the ranging terminal of the base and the size of the hydraulic supports; when the projection points of the points R and W in {O₁} are $R_R$ and $W_W$: $R_R(R_x, R_y, 0)$, and $W_W(W_x, W_y, 0)$, the axial offset amount of the canopy 11 is l:

$$l = |R_x - R_{Rx} + W_x - R_x| = |W_x - R_{Rx}|$$

The step S5 includes the followings: with three ranging terminals as labels and the ranging terminal of the base as base station, the labels receive distance information with the base stations of the bases of three hydraulic supports respectively and determine the position of the hydraulic support group in the reference coordinate system:
the relationship of {O₀} and {O₁} is a translation relationship, and the point of {O₀} is expressed in {O₁}:

$$(i, j, k)|_{o_1} = (i|_{o_0} + l_{o_0 o_1}|_x, j|_{o_0} - l_{o_0 o_1}|_y, k|_{o_0})$$

wherein $(i,j,k)|_{O_1}$ is the coordinate of a particular point in {O₁}; $i|_{O_0}$ is an x axis coordinate of a particular point in {O₀}; $j|_{O_0}$ is a y axis coordinate of a particular point in {O₀}; $K|_{O_0}$ is a z axis coordinate of a particular point in {O₀}; $l_{O_0O_1}|_x$ is a component of the distance from the point O₀ to the point O₁ on the x axis; and $l_{O_0O_1}|_y$ is a component of the distance from the point O₀ to the point O₁ on the y axis;
each point is represented as a vector relationship to obtain a vector $\vec{r}'_i|_{O_1}$ $\vec{r}'_i|_O = i|_O - O_1|_O = (C_O^{O_1})^{-1}$ $\vec{r}'_i|_{O_1} = (C_O^{O_1})^{-1}(i|_{O_1} - O_1|_{O_1})$
wherein i represents each point; $i|_O$ is the coordinate of each hinging point in the reference coordinate system {O}; $C_O^{O_1}$ is a pose transformation matrix between {O} and {O₁}; $i|_{O_1}$ is the coordinate of each hinging point in {O₁}; $O_1|_{O_1}$ is the coordinate of the point O₁ in {O₁}, i.e. $O_1|_{O_1}=(0,0,0)$; $O_1|_O$ is the coordinate of the origin O₁ of {O₁} in the reference coordinate system {O}.

Figure 5:
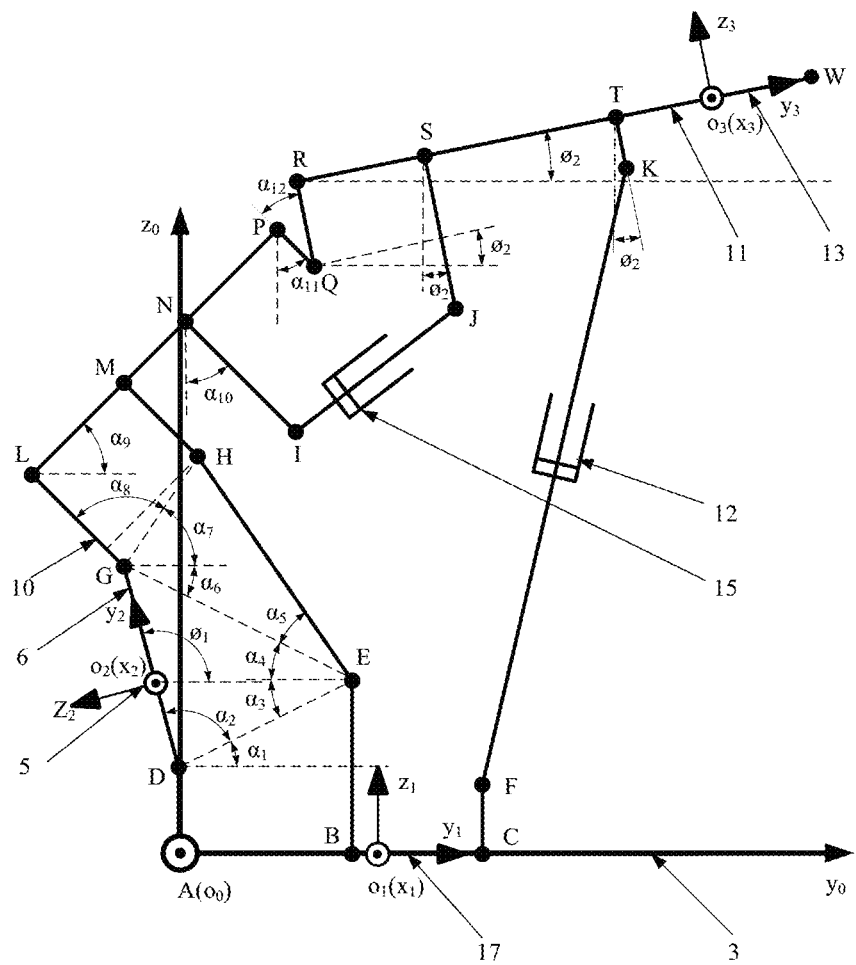
FIG. 5 is a distribution diagram of points and angles.

In the present disclosure, $\alpha_1$, $\alpha_2$, $\alpha_3$, $\alpha_4$, $\alpha_5$, $\alpha_6$, $\alpha_7$, $\alpha_8$, $\alpha_9$, $\alpha_{10}$, $\alpha_{11}$, $\alpha_{12}$, are all angles set on the hydraulic supports, with their specific positions shown in FIG. 5.

The above embodiments are used only to describe the technical solutions of the present disclosure rather than to limit the present disclosure. Although the present disclosure is elaborated by referring to the above embodiments, persons of ordinary skills in the arts should know that they can still modify the technical solutions recorded in the above embodiments or make equivalent replacement to all or part of the above technical features but these modifications or replacements shall not cause the essence of the corresponding technical solutions to depart from the scope of the technical solutions of the embodiments of the present disclosure.

The invention claimed is:

1. A method of perceiving a position and pose of a hydraulic support group based on multi-point ranging, using the hydraulic support group,
the method comprises:
S1: with a plane above the base as a reference plane, establishing a reference coordinate system {O}, selecting three position points which are not in one straight line on the reference plane and then establishing a coordinate system with the three position points;
S2: perceiving a relative position of the base and the canopy of the hydraulic supports;
S3: perceiving the position and pose of a single hydraulic support;
S4: when the hydraulic supports have axial offset and roll phenomenon, performing offset amount calculation;
S5: based on the perception of the position and pose of single hydraulic support, performing perception on the position and pose of the hydraulic support group;
the step of S4 comprises the following steps: the angles of φ and θ are considered and a dual-column hydraulic support model is used; at this time, elongation amounts of two columns are different and one group of caving shield ranging base station is added into the pose perception of the hydraulic supports;
S3.1: the coordinates of points K, K', R, R', W, W' in a third coordinate system $\{O_3\}$ are already known, and the position $\vec{r}_i|_{O_1}$ of the points in a first coordinate system $\{O_1\}$ is calculated, wherein the points K and K' are at both sides of the connection of the canopy and the column, the points R and R' are at both sides of the connection of the canopy and the support beam, and the points W and W' are at both sides of the front end of the canopy;

$$\vec{r}_i|_{O_1} = i|_{O_1} - O_3|_{O_1} = (C_{O_1}^{O_3})^{-1}$$
$$\vec{r}_i|_{O_3} = (C_{O_1}^{O_3})^{-1}(i|_{O_3} - O_3|_{O_3})$$

wherein i refers to the points K, K', R, R', W, W', and $i|_{O_1}$ refers to the coordinates of six points in $\{O_1\}$; $C_{O_1}^{O_3}$ is a coordinate transformation matrix between $\{O_3\}$ and $\{O_1\}$; $i|_{O_3}$ is the coordinates of four points in $\{O_3\}$; $O_3|_{O_3}$ is the coordinate of the point $O_3$ in $\{O_3\}$, i.e. $O_3|_{O_3}=(0,0,0)$; $O_3|_{O_1}$ is the coordinate of the point $O_3$ of $\{O_3\}$ in $\{O_1\}$;
S3.2: true lengths of two columns of the hydraulic supports are calculated:
the length $l_{KF}$ of the column oil cylinder is:

$$l_{KF} = \sqrt{(K_x - F_x)^2 + (K_y - F_y)^2 + (K_z - F_z)^2}$$

the length $l_{K'F'}$ of the column oil cylinder is:

$$l_{K'F'} = \sqrt{(K'_x - F'_x)^2 + (K'_y - F'_y)^2 + (K'_z - F'_z)^2}$$

wherein $K_x$, $K_y$, $K_z$ are the coordinate of the point K', $K'_x$, $K'_y$, $K'_z$ are the coordinate of the point K', $F_x$, $F_y$, $F_z$ are the coordinate of the point F, and $F'_x$, $F'_y$, $F'_z$ are the coordinate of the point F';

S3.3: the axial offset amount of the canopy of the hydraulic supports is calculated:
a projection point $R_R(R_{Rx}, R_{Ry}, 0)$ of the point R in $\{O_1\}$ when no axial offset and roll occurs to the canopy of the hydraulic supports is recorded, and at this time, $R_{Rx}$ is determined by the position of the ranging terminal of the base and the size of the hydraulic supports; when the projection points of the points R and W in $\{O_1\}$ are $R_R$ and $W_W$: $R_R(R_x, R_y, 0)$, and $W_W(W_x, W_y, 0)$, the axial offset amount of the canopy is l;

$$l = |R_x - R_{Rx} + W_x - R_x| = |W_x - R_{Rx}|.$$

wherein the hydraulic support group comprises multiple juxtaposed hydraulic supports, the hydraulic supports comprise a base, a front link bar, a rear link bar, a caving shield, a column and a canopy, the caving shield and the canopy are hinged together with a connection point formed upward into a pointed corner, the column is hinged between a bottom of the canopy and a top of the base, the front link bar and the rear link bar are both hinged between the caving shield and the base, the front link bar is located between the rear link bar and the column, the canopy, the rear link bar and the base are all provided with respective ranging terminals, the column specifically is a column oil cylinder, and the canopy and a support beam bracket are both provided with a balance oil cylinder.

2. The method of claim 1, wherein the step of S1 comprises: with the ranging terminal on the canopy as origin, establishing the third coordinate system $\{O_3\}$ with the origin as $O_3$; with the ranging terminal of the rear link bar as origin, establishing a second coordinate system $\{O_2\}$ with the origin as $O_2$; with the ranging terminal on the base as origin, establishing the first coordinate system $\{O_1\}$ with the origin as $O_1$, wherein three points are set near the $\{O_1\}$, $\{O_2\}$ and $\{O_3\}$ respectively, which are $A_1$, $B_1$, $C_1$, $A_2$, $B_2$, $C_2$, $A_3$, $B_3$, $C_3$ in sequence.

3. The method of claim 2, wherein the step of S2 comprises the following steps:
S2.1: with the ranging terminal of the base as label and the ranging terminal of the canopy as base station, the label receives distance information with the base station, namely, the labels at the points $A_1$, $B_1$, $C_1$ receive the distance information among the points $A_3$, $B_3$, $C_3$; based on the distance information and geometric relationship, the distance information is converted into an inter-plane relative position relationship;
S2.2: coordinates of the points $A_1$, $B_1$, $C_1$ in $\{O_1\}$ are: (0, $-l_{O_1A_1}$, 0), ($l_{O_1B_1}$, 0, 0), (0, $l_{O_1C_1}$, 0), wherein $l_{O_1A_1}=l_{O_3A_3}$, $l_{O_1B_1}=l_{O_3B_3}$, $l_{O_1C_1}=l_{O_3C_3}$ are all self-defined during position point selection; $l_{A_1A_3}$, $l_{A_1B_3}$, $l_{A_1C_3}$, $l_{B_1A_3}$, $l_{B_1B_3}$, $l_{B_1C_3}$, $l_{C_1A_1}$, $l_{C_1B_1}$, $l_{C_1C_3}$ are all obtained by using the ranging devices, wherein $l_{ij}$ is a distance from a point i to a point j;
S2.3: the coordinate of the point $A_3$ in $\{O_1\}$ is set to: $A_{3x}$, $A_{3y}$, $A_{3z}$); the point-to-point distance formula in space is:

$$\sqrt{(A_{3x}-0)^2 + (A_{3y} - (-I_{O_1 BA_1}))^2 + (A_{3z}-0)^2} = l_{A_1 A_3}$$

$$\sqrt{(A_{3x} - I_{O_1 B_1})^2 + (A_{3y}-0)^2 + (A_{3z}-0)^2} = l_{B_1 A_3}$$

$$\sqrt{(A_{3x}-0)^2 + (A_{3y} - I_{O_1 C_1})^2 + (A_{3z}-0)^2} = l_{C_1 A_3}$$

the point $A_3$ is always within a positive value range of $\{O_1\}$, $A_{3z}$ is valued positively to obtain a unique solution, and the coordinate of the point $B_3$ in $\{O_1\}$ is obtain: $(B_{3x}, B_{3y}, B_{3z})$; the coordinate of the point $C_3$ in the base coordinate system $\{O_1\}$ is: $(C_{3x}, C_{3y}, C_{3z})$, based on the coordinate values of the points $A_3$, $B_3$, $C_3$ obtained at a same moment, the coordinate of the point $O_3$ in the base coordinate system $\{O_1\}$ is obtained: $(O_{3x}, O_{3y}, O_{3z})$;

S2.4: rotating $\{O_1\}$ to be in the same direction as $\{O_3\}$ comprises three rotations:

rotating $x_1 y_1 z_1$ around the axis $Z_1$ to obtain $x'y'z'$; rotating $x'y'z'$ around the axis $y'$ to obtain $x''y''z''$; rotating $Z_1$ around the axis $X''$ to obtain $x_3 y_3 z_3$;

wherein $x_1 y_1 z_1$ are three coordinate axes under $\{O_1\}$, and xyz are new coordinate axes obtained by rotating xyz around the axis $Z_1$; $x''y''z''$ are new coordinate axes obtained by rotating $x'y'z'$ around the axis $y'$; $x_3 y_3 z_3$ are new coordinate aces obtained by rotating $x''y''z''$ around axis $y''$;

S2.5: the point $A_3$ is expressed as $\overrightarrow{O_3 A_3}$ and $\overrightarrow{O_3 A_3}$ in $\{O_3\}$ and $\{O_1\}$ respectively; in combination with Rodrigues' Rotation Formula, relative pose angles between a base plane and a canopy plane are calculated as $\varphi$, $\theta$, $\emptyset$:

$$(\overrightarrow{O_3 A_3})^T = C_{O_1}^{O_3} (\overrightarrow{O_3 A_3}^T)$$

wherein $C_{O_1}^{O_3}$ is a rotation matrix:

$$C_{O_1}^{O_3} = \begin{bmatrix} \cos\theta\cos\varphi & \cos\theta\sin\varphi & -\sin\theta \\ -\cos\emptyset\sin\varphi + \sin\emptyset\sin\theta\cos\varphi & \cos\emptyset\cos\varphi + \sin\emptyset\sin\theta\sin\varphi & \sin\emptyset\cos\theta \\ \sin\emptyset\sin\varphi + \cos\emptyset\sin\theta\cos\varphi & -\sin\emptyset\cos\varphi + \cos\emptyset\sin\theta\sin\varphi & \cos\emptyset\cos\theta \end{bmatrix}$$

4. The method of claim 3, wherein the step of S3 comprises:

neglecting the angles of $\varphi$ and $\theta$, and simplifying a single hydraulic support into a planar link-bar mechanism, and based on the inter-plane relative position relationship and structure information of the hydraulic supports, determining the pose of the single hydraulic support;

establishing a coordinate system $\{O_0\}$ with the origin located at a hinging point of the base and the rear link bar, wherein the $y_0$ axis always is parallel to the base and points to an outer side of the hydraulic supports; the $z_0$ axis is perpendicular to the $y_0$ axis and points upward; the axes $x_0$, $y_0$ and $z_0$ form a right-hand coordinate system, and three points are set near $\{O_0\}$, which are the points A, B and C in sequence respectively;

the coordinates of the following points in the coordinate system $\{O_0\}$ are:

$$A(0, 0, 0); B(0, l_{AB}, 0); C(0, l_{AG}, 0) = (0, l_{AB} + l_{BC}, 0);$$

$$D(0, 0, l_{AD}); E(0, l_{AB}, l_{BE});$$

$$F(0, l_{AC}, l_{CF}) = (0, l_{AB} + l_{BC}, l_{CF})$$

The coordinate of the point G is set to:

$$(0, G_y, G_z), G_y = -l_{GD}\cos(180° - \emptyset_1); G_z = l_{AD} + l_{GD}\sin(180° - \emptyset_1)$$

wherein $\emptyset_1$ is a relative Euler angle of two planes, which is obtained by the ranging terminal of the rear link bar and the ranging terminal of the base based on geometric relationship;

the coordinate of the point H is set to:

$$(0, H_y, H_z), H_y = E_y - l_{EH}\cos(\alpha_4 + \alpha_5); H_z = E_z + l_{EH}\sin(\alpha_4 + \alpha_5);$$

$$\alpha_1 = \arctan\left(\frac{l_{BE} - l_{AD}}{l_{AB}}\right); \alpha_2 = \emptyset_1 - \alpha_1;$$

$$l_{GE} = \sqrt{l_{DG}^2 + l_{DE}^2 - 2l_{DG}l_{DE}\cos\alpha_2}; \alpha_3 = \alpha_1;$$

$$\alpha_4 = \arccos\left(\frac{l_{GE}^2 + l_{DE}^2 - l_{DG}^2}{2l_{GE}l_{DE}}\right) - \alpha_3; \alpha_5 = \arccos\left(\frac{l_{GE}^2 + l_{EH}^2 - l_{GH}^2}{2l_{GE}l_{EH}}\right)$$

the coordinate of the point L is set to:

$$(0, L_y, L_z), L_y = G_y - l_{GL}\cos(180° - \alpha_7 - \alpha_8);$$

$$L_z = G_z + l_{GL}\sin(180° - \alpha_7 - \alpha_8);$$

$$\alpha_6 = \alpha_4; \alpha_7 = \arccos\left(\frac{l_{GH}^2 + l_{GE}^2 - l_{EH}^2}{2l_{GH}l_{GE}}\right) - \alpha_6; \alpha_8 = \arctan\left(\frac{l_{ML}}{l_{GL} - l_{MH}}\right)$$

the coordinate of the point M is set to:

$$(0, M_y, M_z), M_y = L_y + l_{ML}\cos\alpha_9; M_z = L_z + l_{ML}\sin\alpha_9;$$

$$\alpha_9 = 90° - (180° - \alpha_7 - \alpha_8) = \alpha_7 + \alpha_8 - 90°$$

the coordinate of the point N is set to:

$$(0, N_y, N_z), N_y = L_y + l_{NL}\cos\alpha_9; N_z = L_z + l_{NL}\sin\alpha_9$$

the coordinate of the point P is set to:

$$(0, P_y, P_z), P_y = L_y + l_{PL}\cos\alpha_9; P_z = L_z + l_{PL}\sin\alpha_9$$

the coordinate of the point I is set to:

$$(0, I_y, I_z), I_y = N_y + l_{NI}\sin\alpha_{10}; I_z = N_z - l_{NI}\cos\alpha_{10}; \alpha_{10} = \alpha_9$$

the coordinate of the point Q is set to:

$$(0, Q_y, Q_z), Q_y = P_y + l_{PQ}\sin\alpha_{11}; Q_z = P_z - l_{PQ}\cos\alpha_{11}; \alpha_{11} = \alpha_{10} = \alpha_9$$

the coordinate of the point R is set to:

$$(0, R_y, R_z), R_y = Q_y - l_{RQ}\sin(\alpha_{11} - \alpha_{12});$$
$$R_z = Q_z + l_{RQ}\cos(\alpha_{11} - \alpha_{12}) \alpha_{12} = \alpha_7 + \alpha_8 - \emptyset_2 - 90°$$

wherein $\emptyset_2$ is a relative Euler angle of two planes, which is obtained by the ranging terminal of the canopy and the ranging terminal of the base based on geometric relationship;

the coordinate of the point S is set to:

$$(0, S_y, S_z), S_y = R_y + l_{RS}\cos\emptyset_2; S_z = R_z + l_{RS}\sin\emptyset_2$$

the coordinate of the point T is set to:

$$(0, T_y, T_z), T_y = R_y + l_{RT}\cos\emptyset_2; T_z = R_z + l_{RT}\sin\emptyset_2$$

the coordinate of the point J is set to:

$$(0, J_y, J_z), J_y = S_y + l_{SJ}\sin\emptyset_2; J_z = S_z - l_{SJ}\cos\emptyset_2$$

the coordinate of the point K is set to:

$$(0, K_y, K_z), K_y = T_y + l_{TK}\sin\emptyset_2; K_z = T_z - l_{TK}\cos\emptyset_2$$

wherein T, S and R are sequentially disposed on the canopy, Q is disposed at the hinging connection of the canopy and a support beam, P, N, M and L are sequentially disposed on the support beam, G is disposed at the hinging connection of the support beam and the rear link bar, D is disposed at the hinging connection of the rear link bar and the base, H is disposed at the hinging connection of the front link bar and the support beam, E is disposed at the hinging connection of the front link bar and the base, I and J are disposed at both ends of the balance oil cylinder respectively, A, B and C are all disposed on the base and correspond to the positions D, E and F respectively, and K is disposed at the hinging connection of the column and the canopy.

5. The method of claim 1, wherein the step S5 comprises the followings: with three ranging terminals as labels and the ranging terminal of the base as base station, the labels receive distance information with the base stations of the bases of three hydraulic supports respectively and determine the position of the hydraulic support group in the reference coordinate system:

the relationship of $\{O_0\}$ and $\{O_1\}$ is a translation relationship, and the point of $\{O_0\}$ is expressed in $\{O_1\}$:

$$(i, j, k)|_{o_1} = (i|_{o_0} + l_{o_0 o_1}|x, j|_{o_0} - l_{o_0 o_1}|y, k|_{o_0})$$

wherein $(i,j,k)|_{O_1}$ is the coordinate of a particular point in $\{O1\}$; $i|_{O_0}$ is an x axis coordinate of a particular point in $\{O_0\}$; $j|_{O_0}$ is a y axis coordinate of a particular point in $\{O_0\}$; $k|_{O_0}$ is a z axis coordinate of a particular point in $\{O_0\}$; $l_{O_0 O_1}|x$ is a component of the distance from the point $O_0$ to the point $O_1$ on the x axis; and $l_{O_0 O_1}|y$ is a component of the distance from the point $O_0$ to the point $O_1$ on the y axis;

each point is represented as a vector relationship to obtain a vector $\vec{r}_i|_O$;

$$\vec{r}_i|_o = i|_o - o_1|_o = (C_o^{o1})^{-1} \vec{r}_i|_{o_1} = (C_o^{o1})^{-1}(i|_{o_1} - o_1|_{o_1})$$

wherein i represents each point; $i|_O$ is the coordinate of each hinging point in the reference coordinate system $\{O\}$; $C_O{}^{O_1}$ is a pose transformation matrix between $\{O\}$ and $\{O_1\}$; $i|_{O_1}$ is the coordinate of each hinging point in $\{O_1\}$; $O_1|_{O_1}$ is the coordinate of the point $O_1$ in $\{O_1\}$, i.e. $O_1|_{O_1}=(0,0,0)$; $O_1|_O$ is the coordinate of the origin $O_1$ of $\{O_1\}$ in the reference coordinate system $\{O\}$.

* * * * *